US011366378B2

(12) United States Patent
Oki et al.

(10) Patent No.: US 11,366,378 B2
(45) Date of Patent: Jun. 21, 2022

(54) LIGHT SOURCE DEVICE, LIGHT SOURCE CONTROL METHOD, AND IMAGE ACQUISITION SYSTEM

(71) Applicant: Sony Corporation, Tokyo (JP)

(72) Inventors: Tomoyuki Oki, Kanagawa (JP); Mitsunori Ueda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/472,912

(22) PCT Filed: Oct. 25, 2017

(86) PCT No.: PCT/JP2017/038531
§ 371 (c)(1),
(2) Date: Jun. 24, 2019

(87) PCT Pub. No.: WO2018/131257
PCT Pub. Date: Jul. 19, 2018

(65) Prior Publication Data
US 2019/0317313 A1 Oct. 17, 2019

(30) Foreign Application Priority Data
Jan. 10, 2017 (JP) ................................ 2017-001941

(51) Int. Cl.
*G02B 21/20* (2006.01)
*G02B 19/00* (2006.01)
(Continued)

(52) U.S. Cl.
CPC .............. *G03B 21/208* (2013.01); *F21V 7/22* (2013.01); *F21V 13/00* (2013.01);
(Continued)

(58) Field of Classification Search
None
See application file for complete search history.

(56) References Cited

U.S. PATENT DOCUMENTS

| 6,396,647 | B1 | 5/2002 | Chen | |
|---|---|---|---|---|
| 2013/0188382 | A1* | 7/2013 | Nieminen | H04N 9/3152 362/551 |
| 2015/0331304 | A1* | 11/2015 | Okamoto et al. | G03B 21/2033 353/85 |

FOREIGN PATENT DOCUMENTS

| JP | H07-95131 B2 | 10/1995 |
|---|---|---|
| JP | 2003-047591 A | 2/2003 |

(Continued)

OTHER PUBLICATIONS

International Search Report and Written Opinion dated Jan. 9, 2018 for PCT/JP2017/038531 filed on Oct. 25, 2017, 11 pages including English Translation of the International Search Report.

(Continued)

*Primary Examiner* — Michelle R Connelly
(74) *Attorney, Agent, or Firm* — Xsensus, LLP

(57) ABSTRACT

A light source device includes a light source unit with at least one set of light sources, wherein each of the at least one set of light sources emits a light of a predetermined wavelength band; an optical waveguide unit that multiplexes light from the at least one set of light sources; and an incident unit, wherein on an incident surface of the incident unit, with an optical axis on the incident unit as a reference position, an installation state of each light source is adjusted such that the maximum separation distances are set equal to each other from the reference position to a maximum incident angle of an incident position of the respective light from the at least one set of light sources incident on the incident unit.

18 Claims, 9 Drawing Sheets

(51) Int. Cl.

| | | |
|---|---|---|
| *F21V 13/00* | (2006.01) | |
| *F21V 7/22* | (2018.01) | |
| *G02B 21/06* | (2006.01) | |
| *G02B 21/36* | (2006.01) | |
| *G02B 23/24* | (2006.01) | |
| *G02B 27/14* | (2006.01) | |
| *G03B 21/20* | (2006.01) | |
| *G02B 6/12* | (2006.01) | |
| *G02B 6/42* | (2006.01) | |
| *G02B 6/00* | (2006.01) | |
| *F21V 8/00* | (2006.01) | |

(52) U.S. Cl.
CPC ........... *G02B 6/12007* (2013.01); *G02B 6/42* (2013.01); *G02B 19/0057* (2013.01); *G02B 21/06* (2013.01); *G02B 21/361* (2013.01); *G02B 23/2469* (2013.01); *G02B 27/141* (2013.01); *G03B 21/2013* (2013.01); *G03B 21/2033* (2013.01); *G03B 21/2066* (2013.01); *G02B 6/0006* (2013.01)

(56) References Cited

FOREIGN PATENT DOCUMENTS

| | | |
|---|---|---|
| JP | 2006-085150 A | 3/2006 |
| JP | 2008-268601 A | 11/2008 |
| JP | 2009-080468 A | 4/2009 |
| JP | 2009-200079 A | 9/2009 |
| JP | 4963925 B2 | 6/2012 |
| JP | 2015-132665 A | 7/2015 |
| JP | 2015-152668 A | 8/2015 |
| JP | 2015-223462 A | 12/2015 |
| WO | 2011/024442 A1 | 3/2011 |
| WO | 2015/182025 A1 | 12/2015 |
| WO | WO-2015182025 A1 * 12/2015 ........... G02B 27/141 |  |

OTHER PUBLICATIONS

Extended Search Report issued in European Application 17891802.5-1020 dated Nov. 28, 2019.
Notice of Reasons for Refusal dated Jan. 18, 2022, in Japanese Patent Application 2018-561819.

\* cited by examiner

LIGHT SOURCE DEVICE, LIGHT SOURCE CONTROL METHOD, AND IMAGE ACQUISITION SYSTEM

CROSS-REFERENCE TO RELATED APPLICATIONS

The present application is based on PCT filing PCT/JP2017/038531, filed Oct. 25, 2017, which claims priority to JP 2017-001941, filed Jan. 10, 2017, the entire contents of each are incorporated herein by reference.

TECHNICAL FIELD

The present disclosure relates to a light source device, a light source control method, and an image acquisition system.

BACKGROUND ART

In recent years, as a light source for illumination of various image acquisition devices such as an endoscope and a microscope, there is a case where white light is used generated by multiplexing lights of a plurality of wavelength bands (hereinafter also referred to as "respective color lights" for convenience). Since the white light generated by multiplexing the respective color lights has high color reproducibility, it can be said that the white light is suitable for imaging an object to be imaged with high accuracy.

On the other hand, since optical profiles such as spatial energy distributions of the respective color lights are not generally the same as each other, there has been a case where unevenness remains in the multiplexed white light. Various studies have therefore been conducted conventionally as a method for reducing the unevenness. For example, Patent Document 1 below discloses that, when a plurality of laser beams emitted from a plurality of light emitting points is condensed and then a divergence angle of each of the plurality of laser beams condensed is spread by a diffusion element, the divergence angle of each of the plurality of laser beams is spread so that two or more of the plurality of laser beams are overlapped to each other. Furthermore, Patent Document 2 below discloses a method that reduces a degree of flattening of illumination Light having a flat light flux cross section and then condenses or diverges the illumination light, and thereafter uniformizes a spatial energy distribution of the illumination light by using a rod integrator.

CITATION LIST

Patent Document

Patent Document 1: Japanese Patent No. 4963925
Patent Document 2: Japanese Patent Application Laid-Open No. 2008-268601

SUMMARY OF THE INVENTION

Problems to be Solved by the Invention

However, in the above method, since the light is guided through an optical element such as a diffusion element or a beam expander, light guiding efficiency is decreased.

The present disclosure has therefore been made in view of the above, and the present disclosure provides a light source device, a light source control method, and an image acquisition system capable of reducing unevenness of multiplexed light while suppressing a decrease is the light guiding efficiency.

Solutions to Problem

According to the present disclosure, there is provided a light source device including: a light source unit that emits a plurality of types of lights; as optical waveguide unit that multiplexes the plurality of types of lights and then guides multiplexed light to an image acquisition device that acquires an image of an imaging object; and an incident unit that causes the plurality of types of lights to be incident on the optical waveguide unit, is which on an incident surface of the plurality of types of lights in the incident unit, with a predetermined position of the incident unit as a reference position, maximum separation distances are equal to each other from the reference position to incident positions of the respective plurality of types of lights incident on the incident unit.

Furthermore, according to the present disclosure, there is provided a light source control method including: emitting a plurality of types of lights; and causing the plurality of types of lights to be incident on an optical waveguide unit, the optical waveguide unit multiplexing the plurality of types of lights and then guiding multiplexed light to an image acquisition device that acquires an image of an imaging object, in which when the plurality of types of lights is caused to be incident on the optical waveguide unit, on an incident surface of an incident unit on which the plurality of types of lights is incident, with a predetermined position of the incident surface as a reference position, maximum separation distances are caused to be equal to each other from the reference position to incident positions of the respective plurality of types of lights.

Furthermore, according to the present disclosure, there is provided an image acquisition system including: an image acquisition device including an imaging unit that images an imaging object; and a light source device that emits illumination light used when the imaging unit images the imaging object, in which the light source device includes: a light source unit that emits a plurality of types of lights; an optical waveguide unit that multiplexes the plurality of types of lights and then guides multiplexed light to the image acquisition device; and an incident unit that causes the plurality of types of lights to be incident on the optical waveguide unit, in which on an incident surface of the plurality of types of lights in the incident unit, with a predetermined position of the incident unit as a reference position, maximum separation distances are equal to each other from the reference position to incident positions of the respective plurality of types of lights incident on the incident unit.

Effects of the Invention

As described above, according to the present disclosure, the unevenness of the multiplexed light can be reduced while the decrease in the guiding efficiency is suppressed.

Note that, the above-described effect is not necessarily limited, and, in addition to the above-described effect, or in place of the above-described effect, any of effects described in the present specification, or other effects that can be grasped from the present specification may be exhibited.

MODE FOR CARRYING OUT THE INVENTION

Preferred embodiments of the present disclosure will be described in detail below with reference to the accompanying drawings. Note that, in the present specification and the drawings, constituents having substantially the same functional configuration are denoted by the same reference signs, and redundant explanations will be omitted.

Note that, the description will be made in the following order.
1. Outline of the present disclosure
2. Functional configuration of device
3. Modifications
4. Remarks
5. Conclusion

Figure 1:
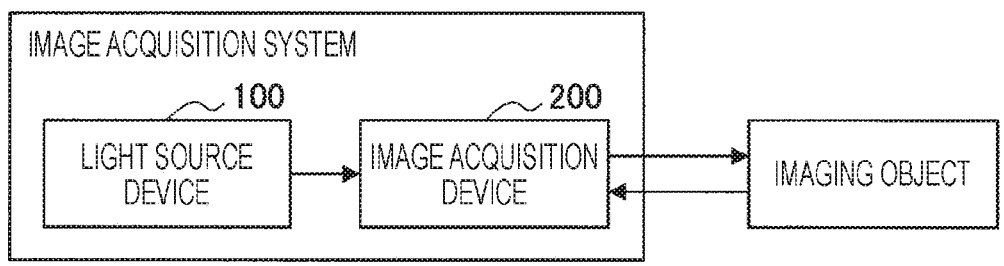
FIG. 1 is a diagram illustrating a configuration of an image acquisition system according to an embodiment of the present disclosure.

1. OUTLINE OF THE PRESENT DISCLOSURE 1-1. Configuration of Image Acquisition System First, with reference to FIG. 1, a configuration will be described of an image acquisition system according to an embodiment of the present disclosure. FIG. 1 is a diagram illustrating the configuration of the image acquisition system according to the embodiment of the present disclosure. As illustrated in FIG. 1, the image acquisition system according to the embodiment of the present disclosure includes a light source device 100 and an image acquisition device 200.

(Image Acquisition System)

The image acquisition system is a system that acquires image data regarding an imaging object by imaging the imaging object. In the present embodiment described below, a case will be described where the image acquisition system is an endoscope system as an example; however, the endoscope system is merely an example, and the image acquisition system may be an arbitrary system. For example, the image acquisition system may be a microscope system, a camera system, a video camera system, or the like. Furthermore, the present disclosure can be applied to a system other than the system that acquires the image data. For example, the present disclosure can be applied to a device such as a projector, an automobile headlight, or a head-up display.

(Light Source Device 100)

The light source device 100 is a device that emits light used as illumination light in the image acquisition device 200. The light source device 100 includes at least one light source that emits light of a predetermined wavelength band for each wavelength band, and has a function of generating white light by multiplexing a plurality of lights emitted from the respective light sources. Furthermore, the light source device 100 includes various optical elements, for example, a mirror, a lens, a rod integrator, and the like, and respective color lights emitted from the corresponding light sources are guided to the image acquisition device 200 via these optical elements. Details of a configuration of the light source device 100 will be described again below.

(Image Acquisition Device 200)

The image acquisition device 200 is a device that acquires image data of an object to be imaged by imaging the object to be imaged. A part of an endoscope unit, which is an example of the image acquisition device 200, is inserted into a subject, and the endoscope unit images the object to be imaged positioned inside the subject. Examples of the image acquisition device 200 include various known endoscopes, for example, a rigid endoscope and a flexible endoscope for medical use, an industrial endoscope, and the like.

The illumination light emitted from the light source device 100 and guided to the image acquisition device 200 propagates through the inside of a bundle fiber provided in the image acquisition device 200, reaches a tip portion of the image acquisition device 200, and illuminates a predetermined area of the object to be imaged. Furthermore, an observation window for observing the object to be imaged is provided at the tip portion of the image acquisition device 200, and an image of the object to be imaged propagates through the observation window and the inside of the image acquisition device 200, and is propagated to an imaging module having an imaging function. The image of the object to be imaged is digitized by the imaging module, and is output to a user of the image acquisition system at any time.

Furthermore, the user of the image acquisition system can obtain an image of a desired area of the object to be imaged at an arbitrary magnification by performing known operation such as driving a zoom optical system provided in the image acquisition device 200, or operating an electronic zoom function mounted in the image acquisition device 200.

1-2. Outline of Configuration of Light Source Device 100

Figure 2:
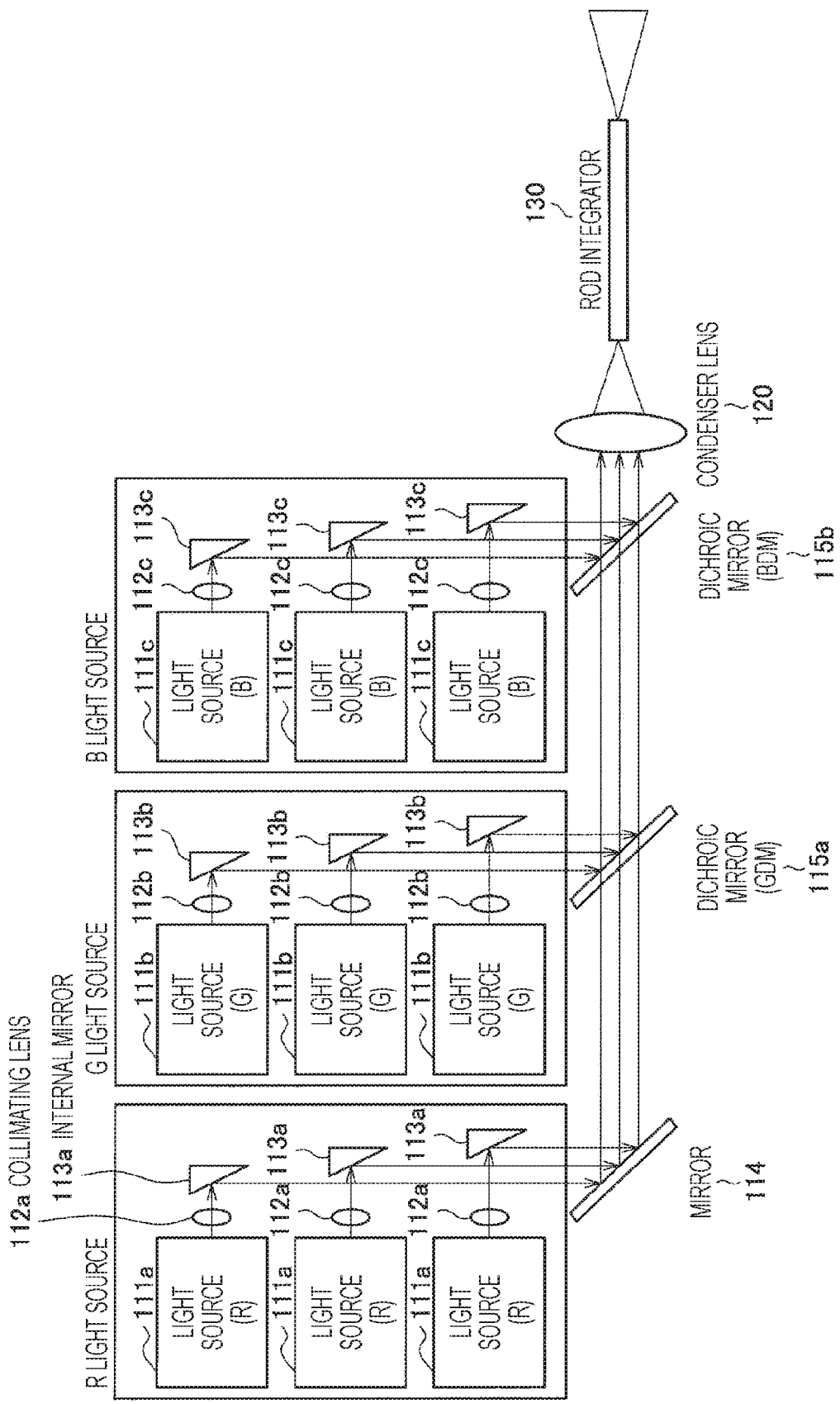
FIG. 2 is a diagram illustrating an outline of a configuration of a light source device according to the embodiment of the present disclosure.

Subsequently, with reference to FIG. 2, an outline of the configuration will be described of the light source device 100 according to the present embodiment. FIG. 2 is a diagram illustrating the outline of the configuration of the light source device 100 according to the embodiment of the present disclosure.

As illustrated in FIG. 2, the light source device 100 according to the present embodiment includes: a light source unit 110 including a light source 111, a collimating lens 112, an internal mirror 113, a mirror 114, and a dichroic mirror 115; a condenser lens 120; and a rod integrator 130, for example.

The light source 111 is a light source that emits light of a predetermined wavelength band, and the light source device 100 includes at least one light source 111 (light sources 111a to 111c) for each of wavelength bands different from each other. Note that, in the present specification, as illustrated in FIG. 2, a case will be described where three light sources 111 are provided for each wavelength band, as an example. Note that, the number of light sources 111 is not limited to that in the example illustrated in FIG. 2. Furthermore, the light source device 100 can adjust the number of light sources 111 to be activated within a range of the number of light sources mounted so that multiplexed light has an appropriate intensity as the illumination light.

Here, as described above, the light source device 100 generates the white light by multiplexing lights of a plurality of wavelength bands; however, a combination is arbitrary of the wavelength bands to which the lights emitted from the respective light sources 111 belong. In the present specification, as an example, a case is assumed where the light source 111 includes the light source 111a that emits red light, the light source 111b that emits green light, and the light source 111c that emits blue light, and the respective color lights are multiplexed to generate the white light.

As the light sources 111, depending on the wavelength band of the light to be emitted, it is possible to appropriately use known laser light sources, such as a semiconductor laser light source, a solid laser light source, a liquid laser light source, and a gas laser light source, a known light emitting diode (LED), or the like. By using any of various semiconductor laser light sources as the light source 111, it is possible to further downsize the device. The semiconductor laser light source is not particularly limited, and, for example, it is possible to use, as a red light source, a GaInP quantum well structure laser diode utilizing a GaInP semiconductor, and it is possible to use, as a green light source and a blue light source, a GaInN quantum well structure laser diode utilizing a GaInN semiconductor.

Light emitted from each of the light sources 111a to 111c is transmitted through corresponding collimating lenses 112a to 112c to become parallel light, and a traveling direction is controlled to a desired direction by internal mirrors 113a to 113c. Thereafter, the red light emitted from the light source 111a is incident on the mirror 114 to be controlled in the traveling direction, sequentially transmitted through a dichroic mirror 115a and a dichroic mirror 115b at the subsequent stage, and incident on the condenses lens 120 that functions as an incident unit. Furthermore, the green light emitted from the light source 111b is incident on the dichroic mirror 115a to be multiplexed with the red light, transmitted through the dichroic mirror 115b at the subsequent stage, and incident on the condenser lens 120. The blue light emitted from the light source 111c is incident on the dichroic mirror 115b to be multiplexed with the red light and the green light, and incident on the condenser lens 120.

Thereafter, the respective color lights of the red light, the green light, and the blue light are condensed by the condenser lens 120, and are incident on the rod integrator 130 that is an example of an optical waveguide unit. The respective color lights repeats total reflection inside the rod integrator 130, whereby uniformity of an in-plane intensity is enhanced.

Here, the dichroic mirror 115a and the dichroic mirror 115b are optical elements having different optical characteristics depending on the wavelength bands of the lights emitted from the respective light sources 111, and transmit light of a predetermined wavelength band while reflecting light of another wavelength band. In the example illustrated in FIG. 2, the dichroic mirror 115a transmits the red light and reflects the green light. Furthermore, the dichroic mirror 115b transmits the red light and the green light and reflects the blue light.

Note that, multiplexing order of the respective color lights is not limited to that in the example illustrated in FIG. 2, and the red light and the blue light may be multiplexed with the green light, or the red light and the green light may be multiplexed with the blue light. In this case, the optical characteristics of the dichroic mirrors 115 as described above are appropriately set depending on the multiplexing order of the respective color lights.

The condenser lens 120 that functions as the incident unit condenses the respective color lights emitted from the light source unit 110, and causes the respective color lights to be incident on the rod integrator 130. Note that, in FIG. 2, only one lens is illustrated as the condenser lens 120; however, the condenser lens 120 may be a lens group including a plurality of lenses. Furthermore, a surface shape of the condenser lens 120 is not particularly limited, and the condenser lens 120 may be a spherical lens or an aspherical lens. Furthermore, a curvature, a lens thickness, and the like of the condenser lens 120 can be appropriately changed depending on a desired design condition.

The rod integrator 130 that functions as the optical waveguide unit is arranged at the subsequent stage of the condenser lens 120, and uniformizes in-plane intensities of the respective color lights incident via the condenser lens 120, and then causes the respective color lights to be incident on the image acquisition device 200. In other words, the rod integrator 130 includes: an incident end on which the respective color lights condensed by the condenser lens 120 are incident; a main body that uniformizes the in-plane intensities of the respective color lights incident from the incident end by inside multi-reflection (total reflection); and a radiation end that radiates the multiplexed light having a uniformized intensity distribution, and the rod integrator 130 radiates, from the radiation end, the light that is incident from the incident end and whose intensity distribution at the radiation end is uniformized by multi-reflection inside the main body, to cause entire light flux of the radiated light to be incident on the image acquisition device 200 thoroughly. Note that, since a maximum incident angle of light incident on the incident end of the rod integrator 130 is preserved, the respective color lights are radiated from the radiation end at the same maximum radiation angles as the maximum incident angles of themselves to the incident end.

Here, in a waveguide of the main body of the rod integrator 130, a shape of the cross section in a direction perpendicular to the optical axis (hereinafter also referred to as a "waveguide shape" for convenience) can have an arbitrary shape. For example, the waveguide shape may be a polygonal shape (triangle, quadrangle, pentagon, . . . , or the like) or a circular shape. However, by having a polygonal shape as the waveguide shape, the rod integrator 130 can further improve an effect of enhancing the uniformity of the in-plane intensity. Therefore, in the present embodiment, it is more preferable to use the rod integrator 130 in which the waveguide shape is a polygonal shape. Furthermore, since the effect of enhancing the uniformity of the in-plane intensity is proportional to the number of times of multi-reflection in the rod integrator 130, it is preferable to adopt the rod integrator 130 having a longer length in the optical axis direction within an allowable range. Furthermore, it is further preferable to adopt the rod integrator 130 capable of implementing a state in which directions of respective sides of the waveguide are not parallel or perpendicular to the long-side direction and the short-side direction of an incident light flux cross section, by rotating the main body of the rod integrator 130. As a result, further downsizing of the light source device 100 can be implemented.

Note that, in the present specification, an example will be described in which the rod integrator 130 is used as the optical waveguide unit; however, an optical element other than the rod integrator 130 may be used as the optical waveguide unit. For example, instead of the rod integrator 130, an optical fiber, a hollow mirror, or the like may be used as the optical waveguide unit. In particular, by using the optical fiber as the optical waveguide unit, the waveguide can be made thinner, and flexibility can be enhanced.

1-3. Shape of Light on Incident Surface of Condenser Lens 120

Figure 3:
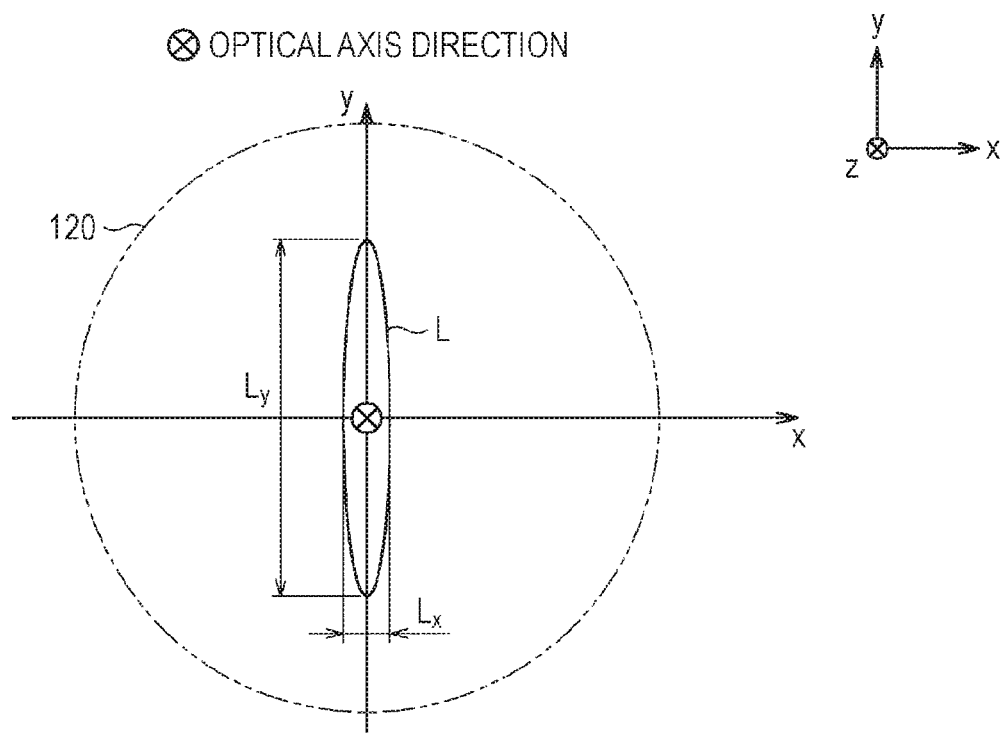
FIG. 3 is a diagram for explaining a shape of light on an incident surface of a condenser lens.
Figure 4:
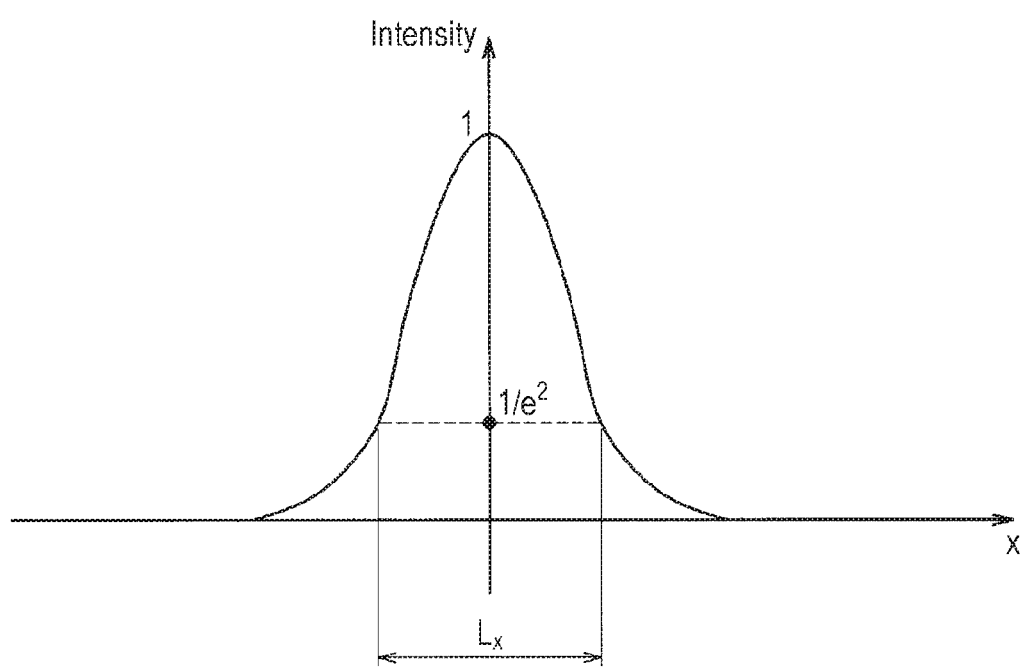
FIG. 4 is a diagram for explaining the shape of the light on the incident surface of the condenser lens.
Figure 5:
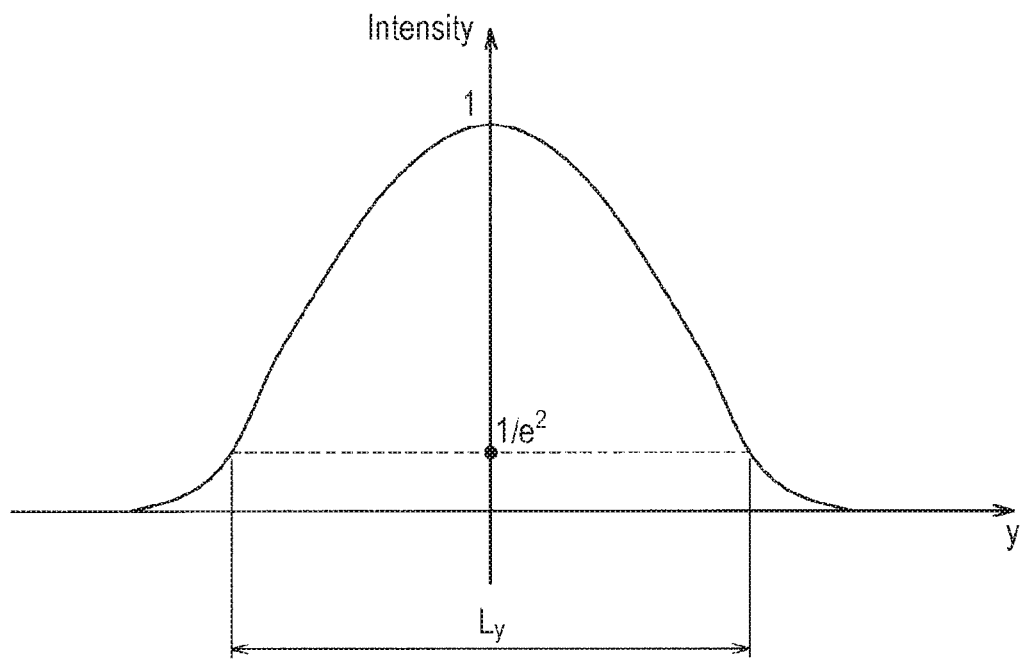
FIG. 5 is a diagram for explaining the shape of the light on the incident surface of the condenser lens.

In the above description, the configuration has been described of the light source device 100 according to the present embodiment. Subsequently, with reference to FIGS. 3 to 5, a shape will be described of light (referred to as light L) on an incident surface of the condenser lens 120. FIGS. 3 to 5 are diagrams for explaining the shape of the light L on the incident surface of the condenser lens 120.

FIG. 3 schematically illustrates the light L incident on the incident surface of the condenser lens 120. Note that, in the following description, explanations will be made according to the coordinate axes as illustrated in FIG. 3 as necessary. In other words, it is assumed that the incident surface of the condenser lens 120 is positioned on the xy plane illustrated in FIG. 3, and the optical axis direction (in other words, the traveling direction of the light L) is the z-axis positive direction.

Here, it is assumed that the shape of the light L on the incident surface of the condenser lens 120 is an elliptical shape as illustrated in FIG. 3. Note that, this shape can be arbitrary (determined by optical characteristics of the light source 111 and lens characteristics of the collimating lens 112). For example, the shape of the light L on the incident surface of the condenser lens 120 may be a circular shape, a linear shape, a polygonal shape, or another predetermined shape.

Here, with reference to FIGS. 4 and 5, values will be described of a short length $L_X$ and a long length $L_Y$ the elliptical shape in FIG. 3. Here, the vertical axis in FIG. 4 indicates the intensity of the light L, and the horizontal axis indicates the value in the x-axis direction. Furthermore, the vertical axis in FIG. 5 indicates the intensity of the light L, and the horizontal axis indicates the value in the y-axis direction. A distribution of the intensity of the light L can be regarded as a Gaussian distribution, as illustrated in FIGS. 4 and 5, for example. As illustrated in FIG. 4 the size of the short length $L_X$ of the elliptical shape in FIG. 3 can be treated as the width between the positions where the intensity is $1/e^2$ of a peak value in the intensity profile of the light L in the z-axis direction. Similarly, the size of the long length $L_Y$ of the elliptical shape in FIG. 3 can be treated as the width between the positions where the intensity is $1/e^2$ of the peak value in the intensity profile of the light L in the y-axis direction.

1-4. Background

In the above description, the shape has been described of the light L on the incident surface of the condenser lens 120. Subsequently, with reference to FIGS. 6 and 7, a background will be described of the present disclosure.

Figure 6:
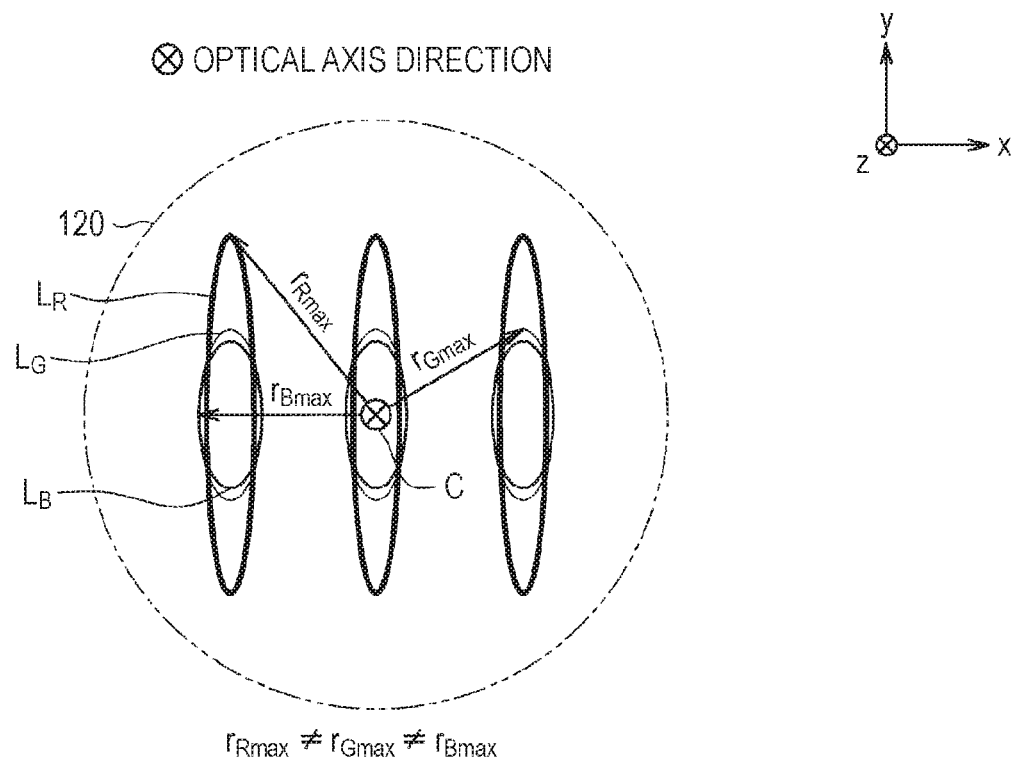
FIG. 6 is a diagram illustrating a case where the present disclosure is not applied and maximum separation distances are different from each other from an optical axis position on the incident surface of the condenser lens to incident positions of respective color lights.

First, with reference to FIG. 6, a shape will be described of light on the incident surface of the condenser lens when the present disclosure is not applied. As illustrated in FIG. 6, red light $L_R$, green light $L_G$, and blue light $L_B$ are incident on the condenser lens. If light-emitting point sizes and radiation angle characteristics are the same as each other among the light sources of respective different wavelength bands, by aligning the optical axes of the respective color lights, shapes become the same as each other of the respective color lights on the incident surface of the condenser lens. However, since the light-emitting point sizes and the radiation angle characteristics are different from each other among the light sources of the respective wavelength bands, even if the optical axes of the respective color lights are aligned, as illustrated in FIG. 6, the shapes are different from each other of the respective color lights on the incident surface of the condenser lens.

Here, maximum separation distances from an optical axis position C on the incident surface of the condenser lens to incident positions of the respective color lights are defined as $r_{Rmax}$, $r_{Gmax}$, and $r_{Bmax}$, respectively. As illustrated in FIG. 6, since the shapes are different from each other of the respective color lights on the incident surface of the condenser lens, $r_{Rmax}$, $r_{Gmax}$, and $r_{Bmax}$ are different values from each other when the present disclosure is not appled. Therefore, since maximum incident angles are not equal to each other of the respective color lights upon incidence on the rod integrator, unevenness (including color unevenness, intensity unevenness, and the like) occurs in the light radiated from the rod integrator. More specifically, in the case illustrated in FIG. 6, the intensity of the color having the longest maximum separation distance becomes higher as it comes close to the outer periphery of the light radiated from the rod integrator. In the example of FIG. 6, the intensity of the red light $L_R$ having the longest maximum separation distance becomes higher at the outer periphery of the radiated light.

Figure 7:
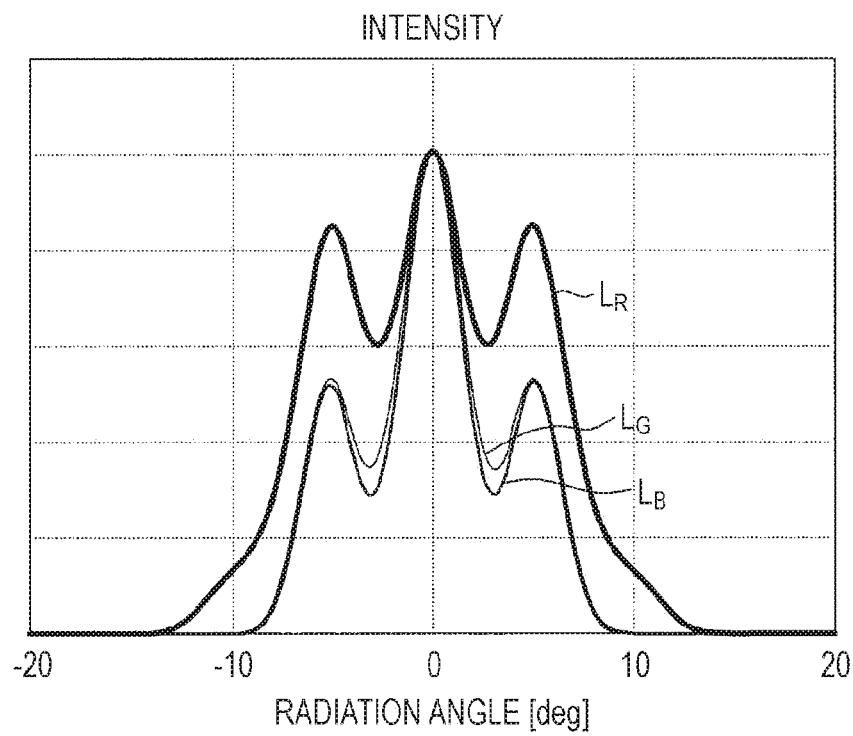
FIG. 7 is a diagram illustrating a radiation angle distribution of light emitted from a rod integrator in the case of FIG. 6.

Here, with reference to FIG. 7, the intensity will be described of the light radiated from the rod integrator FIG. 7 is a diagram illustrating a radiation angle distribution of the light emitted from the rod integrator in the case of FIG. 6. In FIG. 7, the vertical axis indicates the intensity of the light emitted from the rod integrator, and the horizontal axis indicates the radiation angle of the light emitted from the rod integrator. As is apparent from FIG. 7, the maximum radiation angles of the green light $L_G$ and the blue light $L_B$ are less than ±10° with the radiation angle of 0° as the center, whereas the maximum radiation angle of the red light $L_R$ is about ±13° with the radiation angle 0° as the center. In FIG. 6, $r_{Rmax}$ is the longest that is the maximum separation distance from the optical axis position C on the incident surface of the condenser lens to the incident position of the red light, so that, as illustrated in FIG. 7, the maximum radiation angle of the red light from the rod integrator is larger than the maximum radiation angles of the green light and the blue light.

As a result, unevenness occurs in which the red light is emphasized as it comes close to the outer periphery of the illumination light used in the image acquisition device. When unevenness occurs in the illumination light, the user of the image acquisition system has difficulty in separating whether a difference in color tone of an affected part imaged is caused by the unevenness of the illumination light or a state of the affected part.

As a method for reducing the unevenness of the illumination light, Patent Document 1 described above discloses that, when a plurality of laser beams emitted from a plurality of light emitting points is condensed and then a divergence angle of each of the plurality of laser beams condensed is spread by a diffusion element, the divergence angle of each of the plurality of laser beams is spread so that two or more of the plurality of laser beams are overlapped to each other. Furthermore, Patent Document 2 discloses a method that reduces a degree of flattening of illumination light having a flat light flux cross section and then condenses or diverges the illumination light, and thereafter uniformizes a spatial energy distribution of the illumination light by using a rod integrator. However, in these methods, since the light is guided through an optical element such as a diffusion element or a beam expander, light guiding efficiency is decreased. Furthermore, in a case where it is required that the light is transmitted through a thin light guide as in an endoscope or the like, energy density on the optical element is increased, and deterioration of the optical element is likely to occur.

The present inventor has therefore come up with creation of the present disclosure focusing on the above circumstances. In the image acquisition system according to the embodiment of the present disclosure, the incident positions of the respective color lights on the incident surface of the condenser lens 120 are adjusted, whereby unevenness of the multiplexed light can be reduced while a decrease in the light guiding efficiency is suppressed. The description will be made below for an outline of a function of the light source device 100 according to the present embodiment, a functional configuration of each device, modifications, and the like.

1-5. Outline of Function of Light Source Device 100 According to the Present Embodiment In the above description, the background has been described of the present disclosure. Subsequently, with reference to FIGS. 6 and 9, the outline of the function will be described of the light source device 100 according to the present embodiment.

In the light source device 100 according to the present embodiment, the incident positions of the respective color lights on the incident surface of the condenser lens 120 are adjusted, whereby the unevenness of the multiplexed light can be reduced. More specifically, in the light source device 100 according to the present embodiment, the maximum separation distances from the predetermined reference position to the incident positions of the respective color lights on the incident surface of the condenser lens 120 are adjusted to be equal to each other among the respective color lights. Here, the reference position on the incident surface of the condenser lens 120 is preferably the optical axis position C on the incident surface of the condenser lens 120. In this case, in the condenser lens 120 according to the present embodiment, the incident positions of the respective color lights are adjusted to cause $r_{Rmax}$, $r_{Gmax}$, and $r_{Bmax}$ to be equal to each other that are the maximum separation distances from the optical axis position. C that is the reference position to the incident positions of the respective color lights. In other words, $r_{Rmax}$, $r_{Gmax}$, and $r_{Bmax}$ have a relationship below.

[Expression 1]

$$r_{Rmax} = r_{Gmax} = r_{Bmax} \quad \text{(Formula 1)}$$

Figure 8:
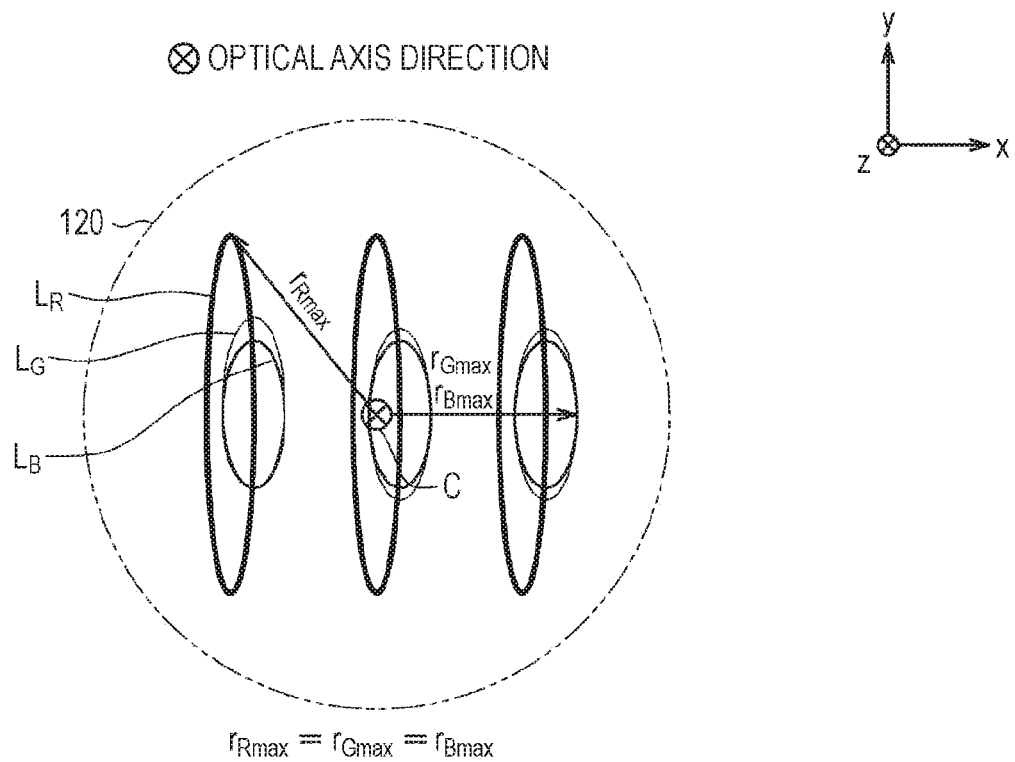
FIG. 8 is a diagram illustrating a case where the present disclosure is applied, whereby the maximum separation distances are equal to each other from the optical axis position on the incident surface of the condenser lens to the incident positions of the respective color lights.

Here, with reference to FIG. 8, the maximum separation distances will be described from the optical axis position C on the incident surface of the condenser lens 120 to the incident positions of the respective color lights. FIG. 8 is a diagram illustrating a case where the present disclosure is applied, whereby the maximum separation distances are equal to each other from the optical axis position C on the incident surface of the condenser lens 120 to the incident positions of the respective color lights.

In the light source device 100 according to the present embodiment, an installation state is adjusted of the light source 111 or each optical element provided in the light source device 100 (for example, an installation position, an installation angle, or the like of the light source 111, various lenses, various mirrors, and the like), whereby the maximum separation distances are equal to each other from the optical axis position C on the incident surface of the condenser lens 120 to the incident positions of the respective color lights as illustrated in FIG. 8. As a result, the maximum incident angles $r_{Rmax}$, $r_{Gmax}$, and $r_{Bmax}$ are equal to each other of the respective color lights incident on the rod integrator 130 from the condenser lens 120, so that unevenness is reduced of the light radiated by the rod integrator 130.

Figure 9:
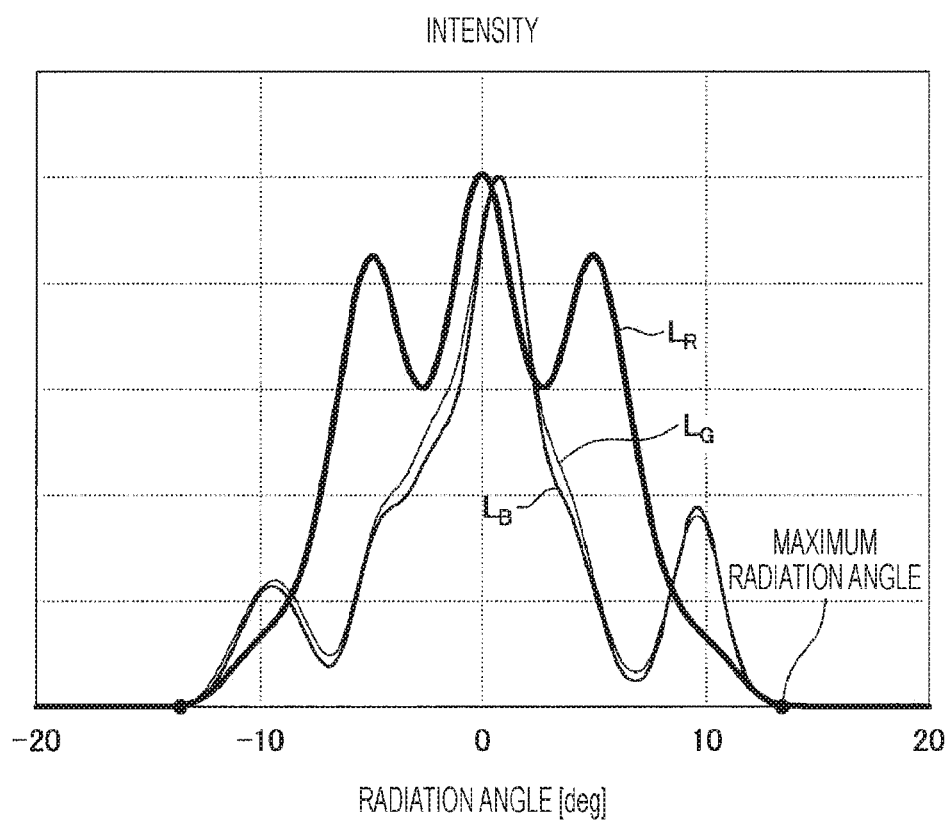
FIG. 9 is a diagram illustrating a radiation angle distribution of light emitted from the rod integrator in the case of FIG. 8.

Here, with reference to FIG. 9, the intensity will be described of the light radiated by the rod integrator 130. FIG. 9 is a diagram illustrating a radiation angle distribution of the light emitted from the rod integrator 130 in the case of FIG. 8. In the light source device 100 according to the present embodiment, as illustrated in FIG. 9, the maximum radiation angles are equal to each other of the respective color lights emitted from the rod integrator 130. As a result, the light source device 100 can reduce unevenness of the illumination light of the image acquisition device 200.

Note that, in the present embodiment, the description will be made assuming that each component of the light source device 100 is adjusted and fixed so that $r_{Rmax}$, $r_{Gmax}$, and $r_{Bmax}$ are equal to each other at a manufacturing stage of the light source device 100; however, this is not a limitation. More specifically, the light source device 100 may statically or dynamically control the installation state (state of the position, the angle, or the like) of the light source 111 or each optical element so that $r_{Rmax}$, $r_{Gmax}$, and $r_{Bmax}$ are equal to each other. Details will be described in "3. Modification example" below.

2. FUNCTIONAL CONFIGURATION OF DEVICE

In the above description, the outline of the function has been described of the light source device 100 according to the present embodiment. Subsequently, with reference to FIGS. 10 and 11, the functional configuration will be described of each device according to the present embodiment.

2-1. Functional Configuration of Light Source Device 100

Figure 10:
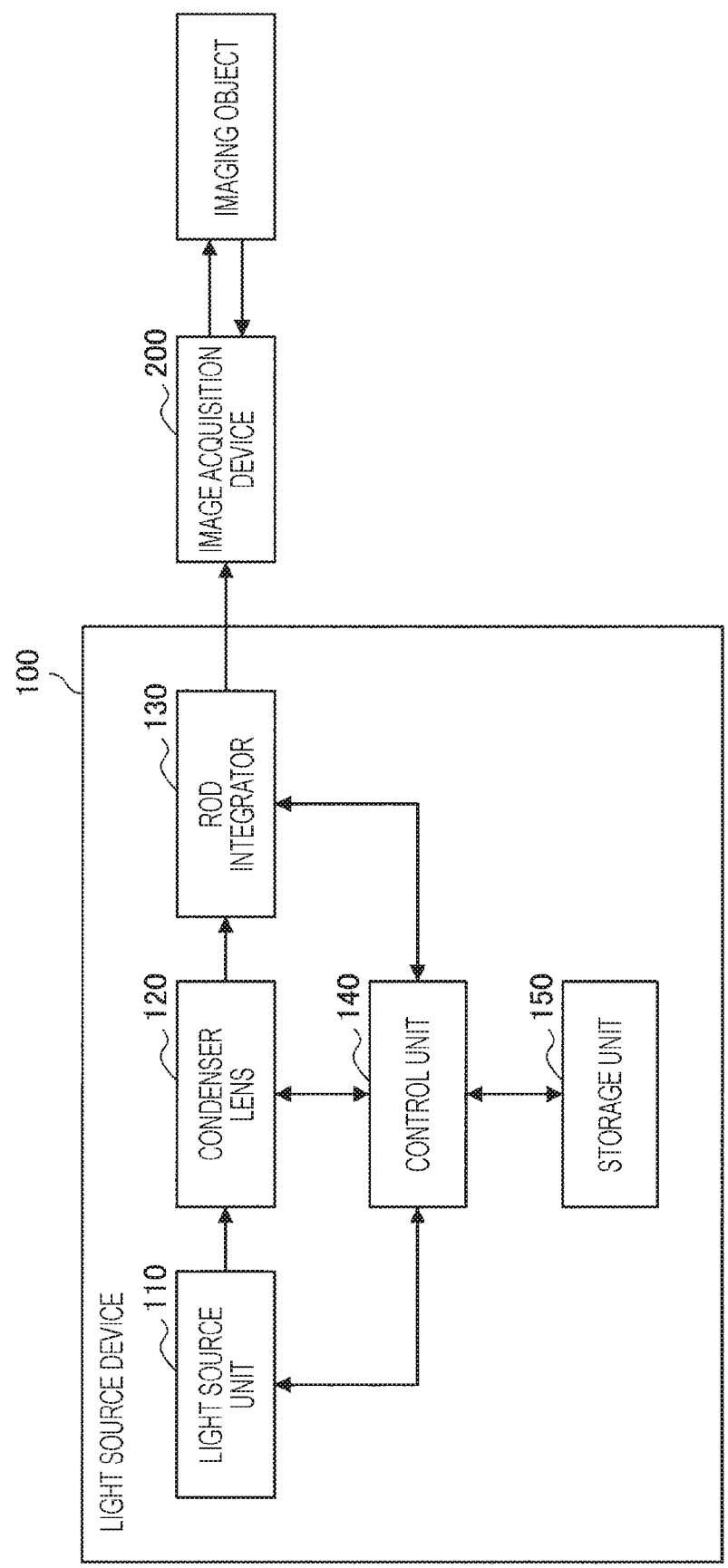
FIG. 10 is a diagram illustrating a functional configuration of the light source device according to the embodiment of the present disclosure.

First, with reference to FIG. 10, the functional configuration will be described of the light source device 100 according to the present embodiment. FIG. 10 is a diagram illustrating the functional configuration of the light source device 100 according to the embodiment of the present disclosure. As illustrated in FIG. 10, the light source device 100 according to the present embodiment includes the light source unit 110, the condenser lens 120, the rod integrator 130, a control unit 140, and a storage unit 150.

(Light Source Unit 110)

The light source unit 110 has the feature and function as described above, and emits a plurality of types of lights each belonging to a predetermined wavelength band. Since the configuration of the light source unit 110 is as described above, detailed description thereof will be omitted below.

(Condenser Lens 120)

The condenser lens 120 has the feature and function as described above, and causes the plurality of types of lights emitted from the light source unit 110 to be incident on the rod integrator 130 positioned at the subsequent stage. Since the configuration of the condenser lens 120 is also as described above, detailed description thereof will be omitted below.

(Rod Integrator 130)

The rod integrator 130 has the feature and function as described above, and multiplexes the plurality of types of lights from the condenser lens 120, and then guides the multiplexed light to the image acquisition device 200 that acquires an image of an imaging object. Since the configuration of the rod integrator 130 is also as described above, detailed description thereof will be omitted below.

(Control Unit 140)

The control unit 140 comprehensively controls operation of the light source device 100 according to the present embodiment. More specifically, the control unit 140 controls a state of the light source unit 110, the condenser lens 120, or the rod integrator 130, thereby providing the illumination light to the image acquisition device 200. The control unit 140 is implemented by, for example, various IC chips and the like including a central processing unit (CPU), a read only memory (ROM), a random access memory (RAM), and the like.

(Storage Unit 150)

The storage unit 150 stores various parameters and databases, various programs, and the like that can be referred to when the control unit 140 performs various types of control processing. Furthermore, the storage unit 150 may store temporary data, various types of history information, and the like generated when the various types of control processing is performed by the control unit 140. The control unit 140 can freely perform data read/write processing on the storage unit 150. The storage unit 150 is implemented by, for example, a ROM, a RAM, a storage device, or the like.

2-2. Functional Configuration of Image Acquisition Device 200

Figure 11:
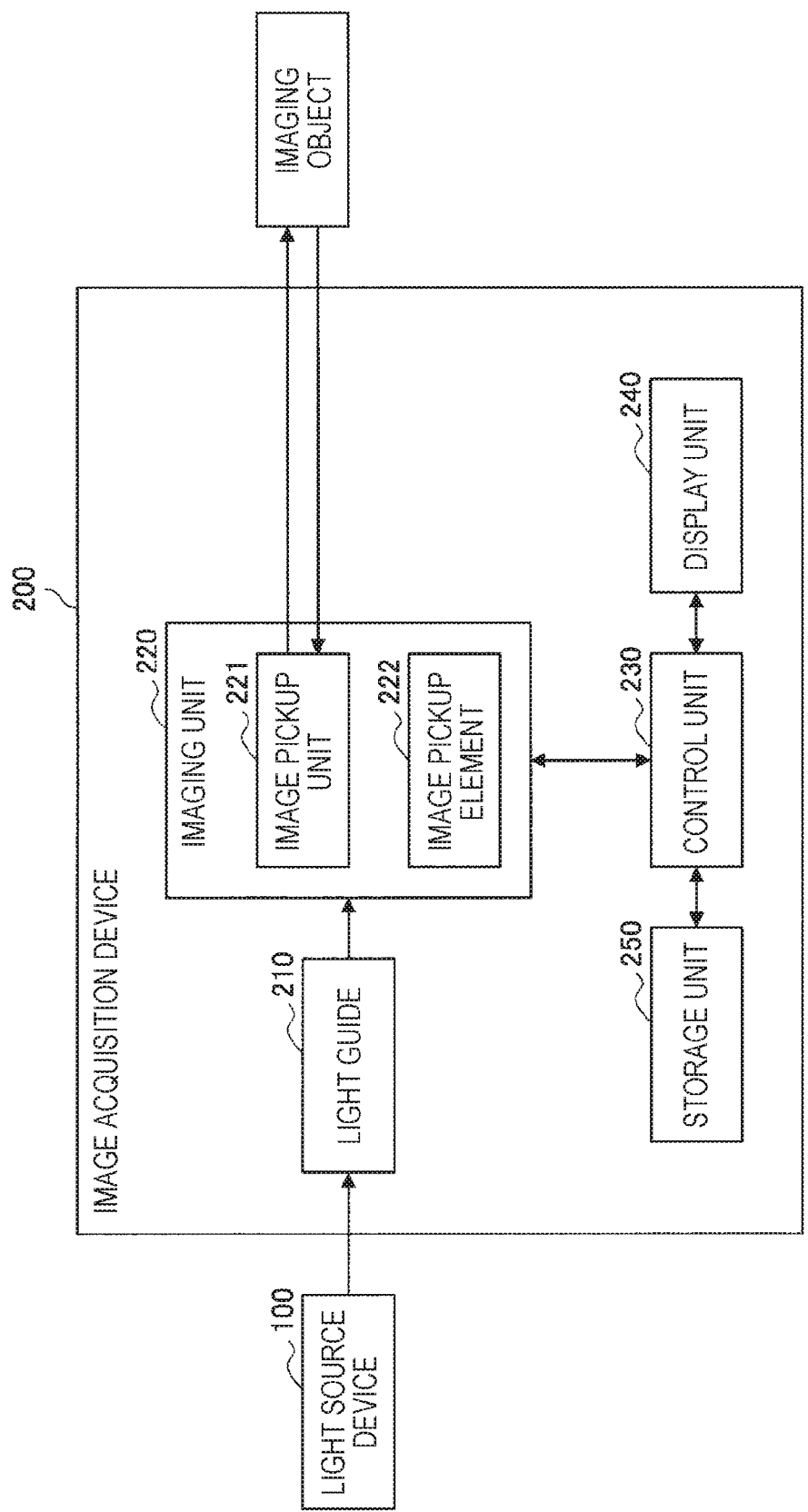
FIG. 11 is a diagram illustrating a functional configuration of an image acquisition device according to the embodiment of the present disclosure.

Subsequently, with reference to FIG. 11, the functional configuration will be described of the image acquisition device 200 according to the present embodiment. FIG. 11 is a diagram illustrating a functional configuration of the image acquisition device 200 according to the embodiment of the present disclosure. As illustrated in FIG. 11, the image acquisition device 200 according to the present embodiment includes a light guide 210, an imaging unit 220, a control unit 230, a display unit 240, and a storage unit 250. The imaging unit 220 includes an image pickup unit 221 and an image pickup element 222.

(Light Guide 210)

The light guide 210 propagates the illumination light emitted from the light source device 100 to the imaging unit 220 as described later. More specifically, the light guide 210 is usually a plurality of index guide type multi-mode optical fibers each having a core diameter of about 10 µm to 80 µm bundled, and propagates the light to the imaging unit 220. The illumination light emitted from the light source device 100 is propagated by the light guide 210, reaches the imaging unit 220, and illuminates a predetermined area of an object to be imaged. The light guide 210 is not particularly limited, and a known light guide can be used.

(Imaging Unit 220)

Under the control of the control unit 230, the imaging unit 220 images the imaging object by using the illumination light from the light guide 210, and generates image data of a captured image. As illustrated in FIG. 11, for example, the imaging unit 220 includes the image pickup unit 221 and the image pickup element 222.

(Image Pickup Unit 221)

The image pickup unit 221 is a unit that forms an image of observation light on a light receiving surface of the image pickup element 222. More specifically, the image pickup unit 221 includes an optical system that radiates the illumination light guided from the light guide 210 to the imaging object, and acquires light (also referred to as observation light) from the imaging object. Moreover, the image pickup unit 221 includes a plurality of lenses combined, including a zoom lens and a focus lens, and its optical characteristics are adjusted so that the image of the observation light acquired is formed on the light receiving surface of the image pickup element 222 as described later. For example, in a case where the image acquisition device 200 is an endoscope device, the image pickup unit 221 corresponds to an endoscope unit in which a part thereof is to be inserted into the imaging object.

Figure 12:
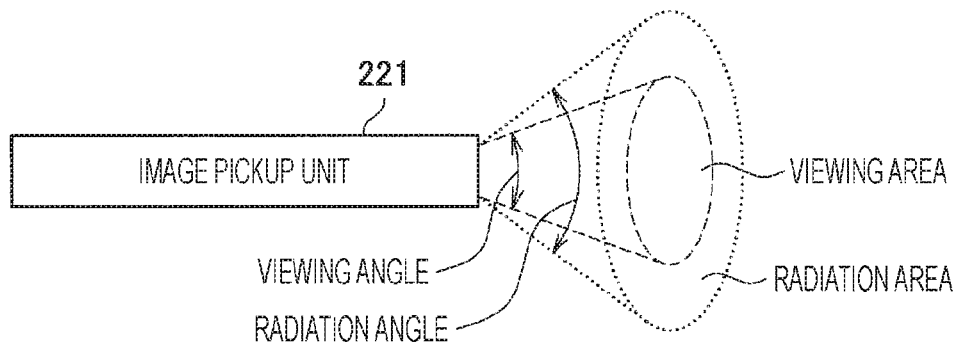
FIG. 12 is a diagram illustrating a relationship between a viewing angle of an image pickup unit and a radiation angle of illumination light radiated from the image pickup unit.

Here, with reference to FIG. 12, a relationship will be described between a viewing angle of the image pickup unit 221 and a radiation angle of the illumination Light radiated from the image pickup unit 221. FIG. 12 is a diagram illustrating the relationship between the viewing angle of the image pickup unit 221 and the radiation angle of the illumination light radiated from the image pickup unit 221. As illustrated in FIG. 12, it is preferable that the radiation angle of the illumination light radiated from a tip portion of the image pickup unit 221 is adjusted to be larger than or equal to the viewing angle of: the image pickup unit 221. As a result, the imaging unit 220 can appropriately image the object to be imaged positioned within a field of view of the image pickup unit 221 by using the illumination light with reduced unevenness.

Here, the radiation angle of the illumination light radiated by the image pickup unit 221 is in a relationship of the same (or correlated) with the maximum radiation angle of the light emitted by the rod integrator 130 (in other words, the maximum incident angle of the light incident on the rod integrator 130). In other words, the maximum radiation angle of the light emitted by the rod integrator 130 is adjusted, whereby the radiation angle of the illumination light radiated by the image pickup unit 221 can be adjusted. Furthermore, as described above, the maximum radiation angle of the light emitted by the rod integrator 130 is adjusted by the maximum separation distances from the optical axis position C on the incident surface of the condenser lens 120 to the incident positions of the respective color lights. Here, when the radiation angle of the illumination light radiated by the image pickup unit 221 is equal to the viewing angle of the image pickup unit 221, when the maximum separation distances are defined as $r_{endo}$ from the optical axis position C on the incident surface of the condenser lens 120 of the light source device 100 to the incident positions of the respective color lights, in the image acquisition system according to the present embodiment, $r_{Rmax}$, $r_{Gmax}$, $r_{Bmax}$, and $r_{endo}$ have a relationship below.

[Expression 2]

$$r_{Rmax} = r_{Gmax} = r_{Bmax} > r_{endo} \quad \text{(Formula 2)}$$

As a result, the imaging unit 220 can appropriately image the object to be imaged positioned within a field of view of the image pickup unit 221 by using the illumination light with reduced unevenness.

(Image Pickup Element 222)

The image pickup element 222 receives the image of the observation light formed on the light receiving surface by the image pickup unit 221, and performs photoelectric conversion, to generate image data corresponding to the observation light. As the image pickup element 222, for example, one is used capable of color photography having a Bayer array, or the like. The image pickup element 222 may be various known image pickup elements, such as a complementary metal oxide semiconductor (CMS) image sensor, or a charge coupled device (CCD) image sensor. The image pickup element 222 provides the generated image data as RAW data to the control unit 230.

The image acquisition device 200 according to the present embodiment can image an image close to a situation directly observed by the human eye by using the image pickup element 222 sensitive to a wavelength band of the visible light band, and appropriately develop the image and then display the developed image on the display unit 240. Furthermore, in a case where the image acquisition device 200 is capable of performing special light observation, besides a normal observation mode for displaying the captured image of the visible light band, the image acquisition device 200 may implement various functions such as a fluorescence observation mode for observing fluorescence generated in a living body by using the image pickup element 222 sensitive to also a wavelength band of the near infrared band, and a narrow band imaging (NBI) observation mode for facilitating identification of blood vessels of different depths from a skin surface by combination of a plurality of specific narrow wavelength bands.

(Control Unit 230)

The control unit 230 comprehensively controls operation of the image acquisition device 200 according to the present embodiment. More specifically, the control unit 230 implements imaging processing described above by controlling the imaging unit 220, and controls the display unit 240 to display the generated image data on the display unit 240. The control unit 230 includes a known drive member such as an actuator or a moving stage, and can drive each component. Note that, the control unit 230 is implemented by, for example, various IC chips and the like including a CPU, a ROM, a RAM, and the like.

(Display Unit 240)

The display unit 240 is controlled by the control unit 230 to display the captured image generated by the imaging unit 220 on a display screen of various displays or the like. The display unit 240 changes the angle of view of the captured image to be displayed on the display screen depending on operation performed by the user of the image acquisition system, and displays the image on the display screen.

In the present specification, an example will be described in which the display unit 240 is included in the image acquisition device 200; however, this is not a limitation. For example, the display unit 240 may be included in a display device (not illustrated) or the like outside the image acquisition device 200. The display device can be implemented by an information processing device such as various computers including a CPU, a ROM, a RAM, and the like, for example.

(Storage Unit 250)

The storage unit 250 stores various parameters and databases, various programs, and the like that can be referred to when the control unit 230 performs various types of control processing. Since the storage unit 250 has a function similar to the storage unit 150, the description thereof will be omitted.

3. MODIFICATIONS

In the above description, the functional configuration has been described of the image acquisition device 200 according to the present embodiment. Subsequently, modifications will be described of the present disclosure.

3-1. First Modification

Figure 13:
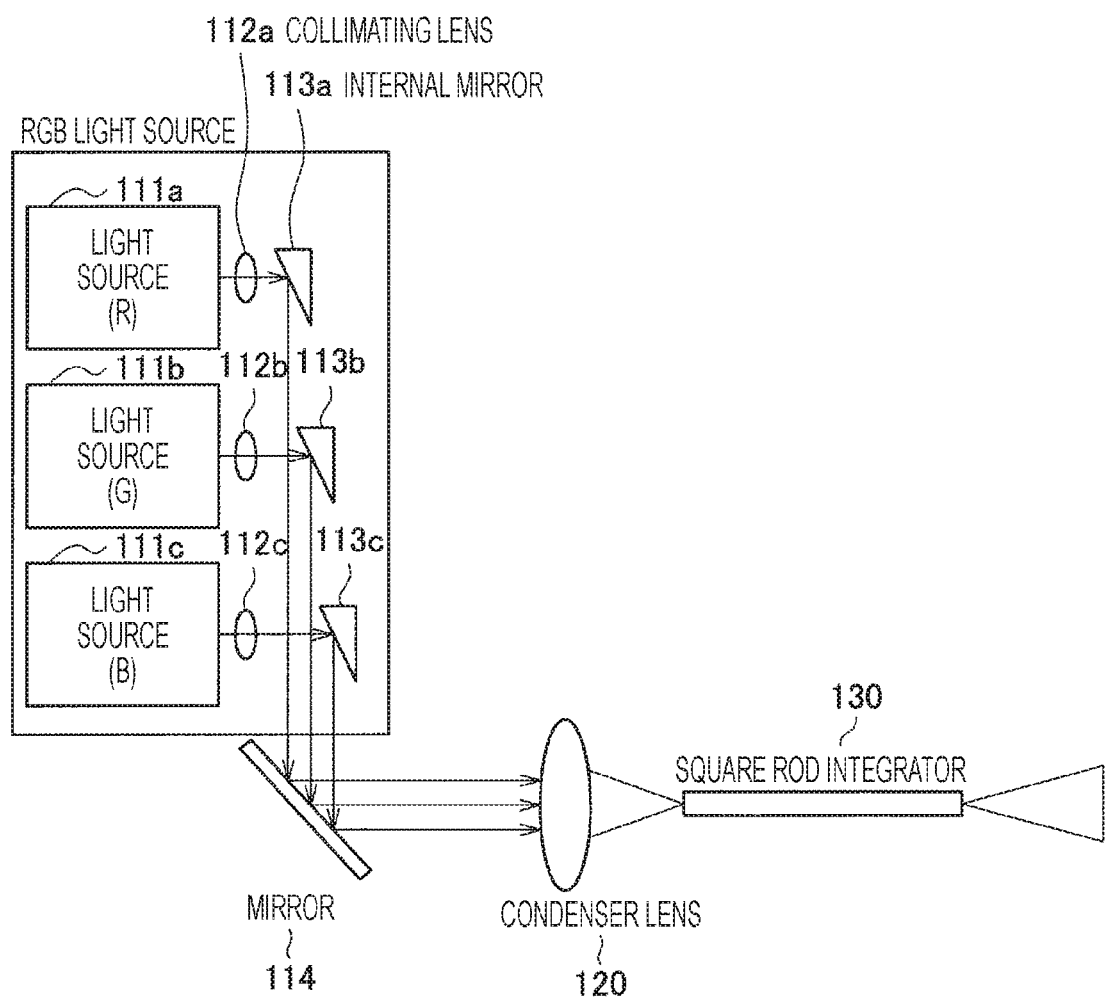
FIG. 13 is a diagram illustrating a configuration of a light source device according to a first modification of the present disclosure.

First, with reference to FIG. 13, a first modification will be described of the present disclosure. FIG. 13 is a diagram illustrating a configuration of the light source device 100 according to the first modification of the present disclosure. The first modification is a case in which one light source 111 for emitting light of a predetermined wavelength band is included for each wavelength band.

As illustrated in FIG. 13, the light source device 100 in the first modification includes one light source 111 for emitting the light of the predetermined wavelength band for each wavelength band. In the above embodiment, to obtain illumination light of a desired intensity, the light source device 100 includes three light sources 111 of each wavelength band; however, in a case where the intensity of light emitted from each light source 111 is high, and the illumination light of the desired intensity can be obtained even with the one light source 111 of the wavelength band, the configuration of the first modification may be used.

Also in the first modification, similarly to the above embodiment, $r_{Rmax}$, $r_{Gmax}$, and $r_{Bmax}$ are equal to each other that are the maximum separation distances from the optical axis position C on the incident surface of the condenser lens 120 to the incident positions of the respective color lights, so that the description thereof will be omitted.

3-2. Second Modification

Subsequently, a second modification will be described of the present disclosure. In the above embodiment, each component of the light source device 100 is adjusted and fixed so that $r_{Rmax}$, $r_{Gmax}$, and $r_{Bmax}$ are equal to each other at the manufacturing stage of the light source device 100, whereas in the second modification, the control unit 140 of the light source device 100 controls each component so that $r_{Rmax}$, $r_{Gmax}$, and $r_{Bmax}$ are equal to each other.

Slope specifically, the light source device 100 in the second modification includes an imaging unit (not illustrated) that images the incident surface of the condenser lens 120, and the imaging unit is controlled by the control unit 140, thereby imaging the incident surface of the condenser lens 120 at any time and providing image data to the control unit 140. The control unit 140 measures $r_{Rmax}$, $r_{Gmax}$, and $r_{Bmax}$ by analyzing the provided image data. For example, the control unit 140 grasps the incident positions of the respective color lights by processing of acquiring a luminance distribution in the image data, processing of detecting a pixel having a relatively large difference in luminance value from surrounding pixels on the basis of the luminance distribution, and the like, and measures $r_{Rmax}$, $r_{Gmax}$, and $r_{Bmax}$ on the basis of the incident positions.

Then, in a case where $r_{Rmax}$, $r_{Gmax}$, and $r_{Bmax}$ measured are not equal to each other, the control unit 140 causes $r_{Rmax}$, $r_{Gmax}$, and $r_{Bmax}$ to be equal to each other by controlling each component with various motors, actuators, and the like. More specifically, the control unit 140 performs adjustment to cause $r_{Rmax}$, $r_{Gmax}$, and $r_{Bmax}$ to be equal to each other by controlling the installation state (the installation position, the installation angle with respect to the optical axis, or the like) of the light source 111, the collimating lens 112, the internal mirror 113, the mirror 114, or the dichroic mirror 115 of the light source unit 110. Note that, the control unit 140 may perform adjustment to cause $r_{Rmax}$, $r_{Gmax}$, and $r_{Bmax}$ to be equal to each other by controlling the installation state of the condenser lens 120 or the rod integrator 130 other than the light source unit 110.

Note that, other than the above method, for example, the control unit 140 may acquire information regarding the radiation angle distributions of the respective color lights emitted from the rod integrator 130, and control each component to cause the maximum radiation angles of the respective color lights to be equal to each other. Furthermore, the control unit 140 may acquire information regarding the incident angle distributions of the respective color lights incident on the rod integrator 130, and control each component to cause the maximum incident angles of the respective color lights to be equal to each other.

As a result, the light source device 100 can further reduce unevenness of multiplexed white light. For example, even in a case where $r_{Rmax}$, $r_{Gmax}$, and $r_{Bmax}$ that have been equal to each other at the manufacturing stage become different from each other due to large vibration applied to the light source device 100, aged deterioration, or the like, the control unit 140 performs fine adjustment, whereby the unevenness of the multiplexed white light can be reduced.

Furthermore, in the second modification, the light source device 100 may be operated to cause unevenness. More specific, the control unit 140 of the light source device 100 may set the maximum separation distance of light of a certain wavelength band longer than another wavelength band to make the intensity higher of the light of the wavelength band on the outer periphery of the multiplexed light. As a result, for example, the image acquisition device 200 makes the intensity higher of the red light on the outer periphery of the multiplexed light, thereby being able to radiate the red Light to a subject (an object to be imaged) and identify a blood vessel of the subject on the basis of a difference in an absorption amount of the red light, for example. Note that, a method of utilizing the technology is not limited to this.

3-3. Third Modification

Subsequently, a third modification will be described of the present disclosure. The third modification is a case where an aberration is corrected.

More specifically, in particular, in a case where a radiation area of illumination light is small, or the like, influence of the aberration (including a chromatic aberration caused by the wavelength, an aberration caused by the lens, and the like) may become so large that it cannot be ignored. The light source device 100 in the third modification can correct these aberrations.

The lenses (the collimating lens 112, the condenser lens 120, and the like) used in the above embodiment are positive lenses; however, the light source device 100 in the third modification can correct the aberration by using a lens (achromatic lens, or the like) in which a positive lens and a negative lens are combined. The light source device 100 is the third modification can satisfactorily correct the influence of the aberration by using a lens is which the positive lens and the negative lens are combined in the order from the upstream side, as the collimating lens 112 and the condenser lens 120. Note that, the same effect can be obtained by using a single aspheric lens instead of the lens in which the positive lens and the negative lens are combined.

The aberration is corrected, whereby the light source device 100 can further reduce the unevenness of the multiplexed light. This technology can be effectively utilized particularly in a case where the radiation area of the illumination light is small.

4. REMARKS

In the above description, the effect has been described that, the maximum separation distances are equal to each other from the optical axis position C on the incident surface of the condenser lens 120 to the incident positions of the respective color lights, or the control unit 140 controls each component to cause the maximum separation distances to be equal to each other, whereby the unevenness of the illumination light is reduced.

Here, the image acquisition system may remove the unevenness of the illumination light by a method other than the above. For example, in a case where the unevenness occurs that the intensity is high of light in a certain wavelength band at the outer periphery of the illumination light, the control unit 230 of the image acquisition device 200 may perform adjustment so that an area where the unevenness occurs is not imaged, by decreasing the viewing angle of the image pickup unit 221.

As a result, for example, even in a case where it is difficult to seduce the unevenness of the illumination light with the method of the present disclosure (the method of causing the maximum separation distances corresponding to the respective color lights to be equal to each other) due to failure or the like, the image acquisition device 200 can image an image of as imaging object by using the illumination light from which the unevenness has been removed.

5. CONCLUSION

As described above, the image acquisition system according to the embodiment of the present disclosure adjusts the incident positions of the respective color lights on the incident surface of the condenser lens 120 of the light source device 100, whereby the maximum incident angles can be made to be equal to each other of the respective color lights incident on the rod integrator 130 from the condenser lens 120. As a result, the image acquisition system according to the present embodiment can reduce the unevenness of the illumination light while suppressing the decrease in the light guiding efficiency.

In the above, the preferred embodiments of the present disclosure have been described in detail with reference to the accompanying drawings; however, the technical scope of the present disclosure is not limited to such examples. It is obvious that persons having ordinary knowledge in the technical field of the present disclosure can conceive various modification examples or correction examples within the scope of the technical idea described in the claims, and it is understood that the modification examples or correction examples also belong to the technical scope of the present disclosure.

For example, some of the components of the light source device 100 or the image acquisition device 200 may be provided in an external device as appropriate. For example, the condenser lens 120 and the rod integrator 130 of the light source device 100 are provided in an external device, and the external device is connected to the light source device 100, whereby the above processing may be implemented. Furthermore, the light guide 210, the display unit 240, and the like of the image acquisition device 200 may be provided in an external device.

Furthermore, some of the functions of the light source device 100 may be embodied by the control unit 140. For example, the control unit 140 may embody some of the functions of the light source unit 110. Similarly to the light source device 100, the control unit 230 of the image acquisition device 200 may embody some of the functions of the imaging unit 220, the display unit 240, and the like.

Furthermore, in the above description, the case has been described where the light source device 100 generates the white light by multiplexing the lights of the plurality of wavelength bands; however, not limited thereto, the light source device 100 may generate light other than the white light by multiplexing the plurality of wavelength bands.

Furthermore, the effects described in the present specification are merely illustrative or exemplary and not restrictive. That is, the technology according to the present disclosure can exhibit other effects obvious to those skilled in the art from the description of the present specification together with the above-described effects or in place of the above-described effects.

Note that, the following configurations also belong to the technical scope of the present disclosure.

(1)

A light source device including:

a light source unit that emits a plurality of types of lights;

an optical waveguide unit that multiplexes the plurality of types of lights and then guides multiplexed light to an image acquisition device that acquires an image of an imaging object; and an incident unit that causes the plurality of types of lights to be incident on the optical waveguide unit, in which on an incident surface of the plurality of types of lights in the incident unit, with a predetermined position of the incident unit as a reference position, maximum separation distances are equal to each other from the reference position to incident positions of the respective plurality of types of lights incident on the incident unit.

(2)

The light source device according to (1), in which the incident unit includes a light condensing element, and the predetermined position is an optical axis position on an incident surface of the light condensing element.

(3)

The light source device according to (2), in which maximum incident angles are equal to each other of the respective plurality of types of lights at an incident end of the optical waveguide unit.

(4)

The light source device according to any one of (1) to (3), in which a radiation angle of illumination light incident from the optical waveguide unit and radiated from the image acquisition device is larger than or equal to a viewing angle of the image acquisition device.

(5)

The light source device according to any one of (1) to (4), in which a cross section in a direction perpendicular to an optical axis of the optical waveguide unit has a polygonal shape.

(6)

The light source device according to (5), in which directions of respective sides of the optical waveguide unit are not parallel or perpendicular to a long-side direction and a short-side direction of a light flux cross section of each of the plurality of types of lights.

(7)

The light source device according to any one of (1) to (6), further including a control unit that controls the light source unit to cause the maximum separation distances to be equal to each other.

(8)

The light source device according to (7), in which the light source unit includes a plurality of types of light sources and an optical element that causes the light emitted from each of the light sources to be incident of the incident unit, and the control unit controls an installation state of the light sources or the optical element.

(9)

The light source device according to any one of (1) to (8), in which each of the plurality of types of lights is any of red light, green light, or blue light.

(10)

The light source device according to any one of (1) to (9), in which the image acquisition device is an endoscope, or a microscope.

(11)

A light source control method including:

emitting a plurality of types of lights; and causing the plurality of types of lights to be incident on an optical waveguide unit, the optical waveguide unit multiplexing the plurality of types of lights and then guiding multiplexed light to an image acquisition device that acquires an image of an imaging object, in which when the plurality of types of lights is caused to be incident on the optical waveguide unit, on an incident surface of an incident unit on which the plurality of types of lights is incident, with a predetermined position of the incident surface as a reference position, maximum separation distances are caused to be equal to each other from the reference position to incident positions of the respective plurality of types of lights.

(12)

An image acquisition system including:

an image acquisition device including an imaging unit that images an imaging object; and a light source device that emits illumination light used when the imaging unit images the imaging object, in which the light source device includes:
  a light source unit that emits a plurality of types of lights;
  an optical waveguide unit that multiplexes the plurality of types of lights and then guides multiplexed light to the image acquisition device; and
  an incident unit that causes the plurality of types of lights to be incident on the optical waveguide unit, in which
    on an incident surface of the plurality of types of lights in the incident unit, with a predetermined position of the incident unit as a reference position, maximum separation distances are equal to each other from the reference position to incident positions of the respective plurality of types of lights incident on the incident unit.

REFERENCE SIGNS LIST

100 Light source device
110 Light source unit
120 Condenser lens
130 Rod integrator
140 Control unit
150 Storage unit
200 Image acquisition device
210 Light guide
220 Imaging unit
221 Image pickup unit
222 Image pickup element
230 Control unit
240 Display unit
250 Storage unit

The invention claimed is:

1. An apparatus for providing light for illumination of an object to be imaged, the apparatus comprising:
  at least one set of light sources configured to emit light of a predetermined wavelength band, and wherein, each of the at least one set of light sources includes at least two light sources that emit light which includes light of the same predetermined wavelength band;
  an optical waveguide configured to guide light from the at least one set of light sources to the object;
  an incident lens configured to direct the light from the at least one set of light sources to be incident on the optical waveguide, wherein, with an optical axis on the optical waveguide as a reference position, an installation position of each light source in each of the at least one set of light sources is adjusted such that the maximum incident angles are set equal to each other from the reference position to an incident position of light at an outer periphery of the optical waveguide thereof from the at least one set of light sources incident on the incident lens; and
  control circuitry configured to control the at least one set of light sources to cause the maximum separation distances to be equal to each other, wherein
  the at least one set of light sources includes a plurality of types of light sources and an optical element that causes the light emitted from each of the light sources to be incident on the incident lens, and
  the control circuitry is configured to control the installation position of the light sources or the optical element.

2. The apparatus according to claim 1, wherein the incident lens includes a condensing lens.

3. The apparatus according to claim 2, wherein maximum incident angles are equal to each other of the respective light from the at least one set of light sources at an incident end of the optical waveguide.

4. The apparatus according to claim 1, wherein a cross section in a direction perpendicular to an optical axis of the optical waveguide has a polygonal shape.

5. The apparatus according to claim 4, wherein directions of respective sides of the optical waveguide are not parallel or perpendicular to a long-side direction and a short-side direction of a light flux cross section of each of the at least one set of light sources.

6. The apparatus according to claim 1, wherein each of the at least one set of light sources is any of red light, green light, or blue light.

7. The apparatus according to claim 1, wherein the optical waveguide includes an optical fiber, a hollow mirror, or a rod integrator.

8. The apparatus according to claim 1, wherein image optics direct light guided by the optical waveguide onto the object.

9. The apparatus according to claim 8, wherein a radiation angle of illumination light incident from the optical waveguide and radiated from the image optics is larger than or equal to a viewing angle of the image optics.

10. The apparatus according to claim 8, wherein. the image optics are part of an endoscope or a microscope.

11. A light source control method comprising:
  emitting light from at least one set of light sources, wherein each of the at least one set of light sources emits a light of a predetermined wavelength band, and wherein, each of the at least one set of light sources includes at least two light sources that emit light of the same predetermined wavelength band;
  directing the light to be incident on an incident surface of an incident lens and thereby on an optical waveguide that guides the light from the at least one set of light sources to an imaging object;
  adjusting an installation position of each light source in each of the at least one set of light sources such that the maximum incident angles are set equal to each other from an optical axis of the incident lens to an incident position of light at an outer periphery thereof from the at least one set of light sources incident on the incident lens;
  controlling the at least one set of light sources to cause the maximum separation distances to be equal to each other, wherein
  the at least one set of light sources includes a plurality of types of light sources and an optical element that causes the light emitted from each of the light sources to be incident on the incident lens; and
  controlling the installation position of the light sources or the optical element.

12. An image acquisition system comprising:
  a sensor that images an object to be imaged; and
  a light source that emits illumination light used when the sensor images the object, wherein
  the light source includes:
    at least one set of light sources configured to emit, light of a predetermined wavelength band, wherein each of the at least one set of light sources includes at least two light sources that emit light which includes light of the same predetermined wavelength band;
    an optical waveguide configured to guide light from the at least one set of light sources to the sensor;

an incident lens that directs the light from the at least one set of light sources to be incident on the optical waveguide, wherein on an incident surface of the incident lens, with an optical axis on the optical waveguide as a reference position, an installation position of each light source in each of the at least one set of light sources is adjusted such that the maximum incident angles are set equal to each other from the reference position to an incident position of light at an outer periphery thereof from the at least one set of light sources incident on the incident lens; and control circuitry configured to control the at least one set of light sources to cause the maximum separation distances to be equal to each other, wherein the at least one set of light sources includes a plurality of types of light sources and an optical element that causes the light emitted from each of the light sources to be incident on the incident lens, and the control circuitry is configured to control the installation position of the light sources or the optical element.

13. The image acquisition system according to claim 12, wherein the sensor is part of an endoscope or a microscope.

14. The image acquisition system according to claim 12, further comprising image optics to direct light guided by the optical waveguide onto the object.

15. The image acquisition system according to claim 14, wherein the image optics direct light from the object onto the sensor.

16. A light source device comprising:

a plurality of light sources including a first light source configured to emit first light of a first wavelength and a second light source configured to emit second light of a second wavelength;

an optical element configured to guide light from the light sources to an imaging object;

a lens configured to direct the first light and the second light from the light sources to be incident on the optical element, wherein on an incident surface of the lens, with an optical axis on the optical elements as a reference position, an installation position of each light source of the plurality of light sources is adjusted such that the maximum incident angles are set equal to each other from the reference position to an incident position of light at an outer periphery thereof of the first light and second light incident on the lens; and control circuitry configured to control the at least one set of light sources to cause the maximum separation distances to be equal to each other, wherein the at least one set of light sources includes a plurality of types of light sources and an optical element that causes the light emitted from each of the light sources to be incident on the incident lens, and the control circuitry is configured to control the installation position of the light sources or the optical element.

17. The light source device according to claim 16, wherein image optics direct light guided by the optical element onto the imaging object.

18. The light source device according to claim 16, wherein both positive and negative maximum separation distances of the first light and the second light are equal.

\* \* \* \* \*